US007859951B2

(12) United States Patent
Plancon

(10) Patent No.: US 7,859,951 B2
(45) Date of Patent: Dec. 28, 2010

(54) UNIVERSAL ELECTRONIC DEVICE MODULE CONFIGURATION

(75) Inventor: Michel G. Plancon, Besancon (FR)

(73) Assignee: Timex Group B.V. (NL)

( * ) Notice: Subject to any disclaimer, the term of this patent is extended or adjusted under 35 U.S.C. 154(b) by 921 days.

(21) Appl. No.: 11/174,095

(22) Filed: Jun. 30, 2005

(65) Prior Publication Data

US 2007/0008823 A1 Jan. 11, 2007

Related U.S. Application Data

(60) Provisional application No. 60/691,882, filed on Jun. 17, 2005.

(51) Int. Cl.
*G04B 19/04* (2006.01)
*G01D 11/00* (2006.01)

(52) U.S. Cl. .......................... 368/80; 368/228; 116/289

(58) Field of Classification Search .................. 368/80, 368/223–225, 276, 228, 81; 116/284, 289, 116/308
See application file for complete search history.

(56) References Cited

U.S. PATENT DOCUMENTS 3,855,787 A * 12/1974 Assmus ...................... 368/238
4,796,240 A 1/1989 Stevens
5,155,711 A 10/1992 Schwartz
5,659,521 A 8/1997 Amano
5,844,863 A 12/1998 Voss et al.
5,943,302 A * 8/1999 Fanshaw ..................... 368/276
5,959,941 A * 9/1999 Murakami et al. ............ 368/80
2001/0019517 A1* 9/2001 Ogasawara .................. 368/37
2004/0013042 A1* 1/2004 Farine ......................... 368/10
2004/0233788 A1 11/2004 Plancon et al. ................... 25/4

FOREIGN PATENT DOCUMENTS

EP 0 862 098 9/1998
EP 1 118 915 7/2001
WO 98/32057 7/1998

* cited by examiner

*Primary Examiner*—Vit W Miska
*Assistant Examiner*—Sean Kayes
(74) *Attorney, Agent, or Firm*—Carmody & Torrance LLP

(57) ABSTRACT

A movement assembly for controlling at least one display indicator of a first display assembly and at least one display indicator of a second display assembly in a wearable electronic device, wherein the at least one display indicator of the first display assembly is arranged different from the arrangement of the at least one display indicator of the second display assembly, wherein the movement assembly is adapted for individually receiving both the first display assembly and the second display assembly, wherein the display functionality of the wearable electronic device is changeable based on the display assembly operatively coupled to one or more gears in the module and whereby the module can be used to provide differing display functionality based on the display assembly coupled thereto.

22 Claims, 6 Drawing Sheets

UNIVERSAL ELECTRONIC DEVICE MODULE CONFIGURATION

RELATED APPLICATIONS

This application claims the benefit of U. S. Provisional Application No. 60/691,882, filed Jun. 17, 2005.

BACKGROUND OF THE INVENTION

This invention relates generally to electronic devices such as timepieces, and in particular, to a wearable electronic device such as for example and not limitation, a wristwatch, that can utilize a single configuration of a module and subassembly with at least two different display assemblies. Specifically, the present invention is directed to the customization or changeability of the controller used in connection therewith.

Wristwatches having a single module that can accommodate more than one display are known. For example, U.S. Pat. No. 4,796,240 describes a timepiece having a central cartridge casing into which can be individually deposited two fully assembled time indicator cartridges, each of which contain a particular clock face design. Because the functionality and arrangement of the display indicators are identical in each of the two cartridges, interchangeability is somewhat easy and routine.

Another known example of a movement subassembly having common elements for adoption to both a two hand timepiece or a three hand timepiece is described in U.S. Pat. No. 5,155,711, and a third known example of a module adapted for receiving interchangeable casings is described in U.S. Pat. No. 5,844,863.

However, in distinction to the invention that will be hereinafter disclosed, these prior art examples all require a module and subassembly that is essentially "dumb," i.e. neither the module nor the subassembly know what (nor can it be modified to operatively control) differing displays or casings that have been inserted therein. That is, it is believed that the prior art merely allows only for the interchangeability or modification of casings as long as each one operates under a uniform and identical circuit. In that none of the cited documents utilize a microcontroller that is customizable or changeable to control the display indicators, each of the foregoing examples are in effect limited in their versatility.

The present invention furthers the state of the art by providing a customization or changeability of the controller to accommodate differing display assemblies. It is believed that the functionality and methodologies to provide the foregoing advantages and achieve the aforementioned objectives, as well as those set forth below, are provided by the present invention.

SUMMARY AND OBJECTIVES OF THE INVENTION

It is thus an objective of the present invention to overcome the perceived deficiencies in the prior art.

It is another objective and advantage of the present invention to provide an electronic device that utilizes a more versatile movement assembly, and more specifically to provide a movement assembly that can accommodate differing display assemblies with differing display indicators.

It is yet another object of the present invention to provide an improved electronic device in which the functionality of the movement assembly can be modified, changed and/or enhanced by the customization or changing of the controller.

Still another object of the present invention is to provide an electronic device assembly that reduces manufacturing costs, inventory costs and schedule time, as well as increases efficiency in manufacturing flexibility.

Still other objects and advantages of the invention will in part be obvious and will in part be apparent from the specification.

The invention accordingly comprises the features of construction, combination of elements and arrangement of parts and sequence of steps which will be exemplified in the construction, illustration and description hereinafter set forth, and the scope of the invention will be indicated in the claims.

To carry out the advantages and objectives set forth above and below, the present invention, generally speaking, is directed to a movement assembly for controlling at least one display indicator of a first display assembly and at least one display indicator of a second display assembly in a wearable electronic device, wherein the at least one display indicator of the first display assembly is arranged different from the arrangement of the at least one display indicator of the second display assembly, wherein the movement assembly is adapted for individually receiving both the first display assembly and the second display assembly, wherein the movement assembly comprises a module within which is disposed a subassembly comprising at least one actuation mechanism and one or more gears rotatably engaged with the actuation mechanism, wherein actuation of the actuation mechanism causes the rotation of the one or more gears; a controller, operatively coupled to the actuation mechanism, for controlling the actuation of the actuation mechanism; and means for changing the functionality of the controller based on the one of the first and second display assemblies for operative coupling to the one or more gears in the module; whereby the display functionality of the wearable electronic device is changeable based on the display assembly operatively coupled to the one or more gears in the module and whereby the module and subassembly can be used to provide differing display functionality based on the display assembly coupled thereto.

The invention is also directed to a wearable electronic device comprising a movement assembly for controlling at least one display indicator of a first display assembly and at least one display indicator of a second display assembly, wherein the arrangement of the at least one display indicator of the first display assembly is different from the arrangement of the at least one display indicator of the second display assembly, wherein the movement assembly is adapted for individually receiving both the first display assembly and the second display assembly and comprises a module within which is disposed a subassembly comprising at least one actuation mechanism and one or more gears rotatably engaged with the actuation mechanism, wherein actuation of the actuation mechanism causes the rotation of the one or more gears, wherein the improvement comprises a controller with changeable functionality, operatively coupled to the actuation mechanism, for controlling the actuation of the actuation mechanism; wherein the functionality of the controller for operating the first display assembly is different from the functionality for operating the second display assembly; whereby the display functionality of the wearable electronic device is changeable based on the display assembly operatively coupled to the one or more gears in the module and whereby the module and subassembly can be used to provide differing display functionality based on the display assembly coupled thereto.

In yet an alternative arrangement, the invention is directed to a wearable electronic device comprising a movement assembly for controlling at least one display indicator of a first display assembly and at least one display indicator of a second display assembly, wherein the arrangement of the at least one display indicator of the first display assembly is different from the arrangement of the at least one display indicator of the second display assembly, wherein the movement assembly is adapted for individually receiving both the first display assembly and the second display assembly and comprises a module within which is disposed a subassembly comprising at least one actuation mechanism and one or more gears rotatably engaged with the actuation mechanism, wherein actuation of the actuation mechanism causes the rotation of the one or more gears, wherein the improvement comprises a customized controller, operatively coupled to the actuation mechanism, for controlling the actuation of the actuation mechanism; wherein the functionality of the controller is customized to individually and operatively control the at least one display indicator of the first display assembly and operatively control the at least one display indicator of the second display assembly; wherein the functionality of the controller to operatively control the at least one display indicator of the first display assembly is different from the functionality for operating the at least one display indicator of the second display assembly; whereby the display functionality of the wearable electronic device is changeable based on the display assembly operatively coupled to the one or more gears in the module and whereby the module and subassembly can be used to provide differing display functionality based on the display assembly coupled thereto.

Methods of constructing a wearable electronic device comprising the movement assembly set forth above are also disclosed.

In the preferred embodiment, the electronic device has timekeeping functionality, and thus, in a specific embodiment, is a wristwatch.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DESCRIPTION OF THE PREFEERED EMBODIMENTS

Figure 3:
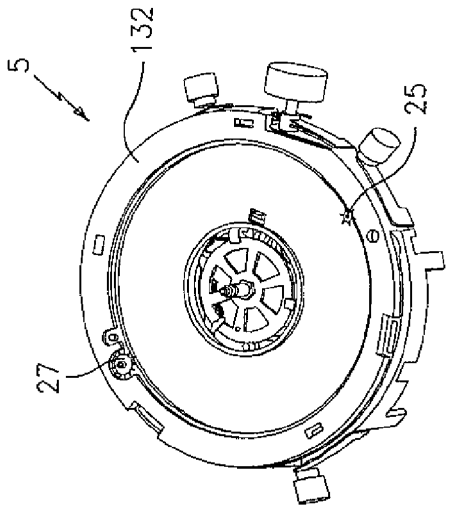
FIG. 3 is a perspective view of the module assembly of FIG. 1in a subsequent stage of completion for an electronic device constructed in accordance with the present invention.
Figure 1:
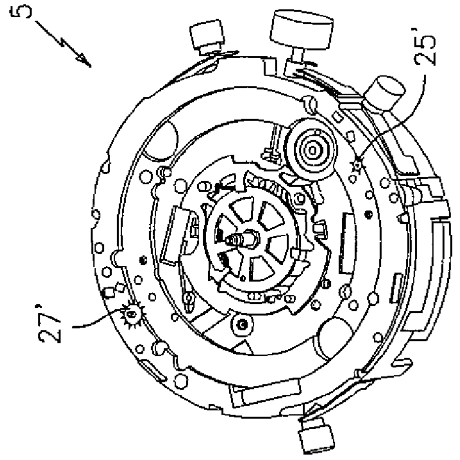
FIG. 1 is a perspective view of a module assembly constructed in accordance with the present invention.
Figure 2:
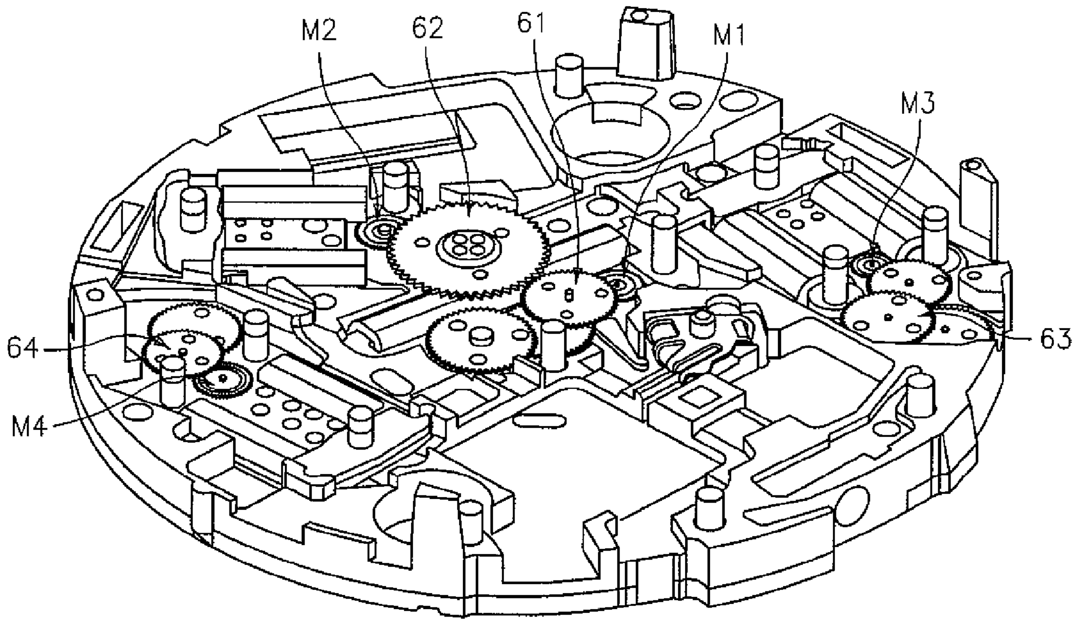
FIG. 2 is a perspective view of the movement side of the module assembly of FIG. 1.

Reference is first made generally to FIGS. 1-3, which illustrates a module, generally indicated at 5, constructed in accordance with the present invention. In the preferred construction, module 5 is part of an electronic device, which may be a timepiece having the configuration and construction as set forth in FIG. 4 (a first exemplary embodiment) or in FIGS. 5-8 (a second exemplary embodiment). The electronic device may be a timepiece such as a wristwatch, and thus may comprise other features and parts, namely for example and not limitation, a wrist strap (not shown) for securing the electronic device to a wrist.

Figure 4:
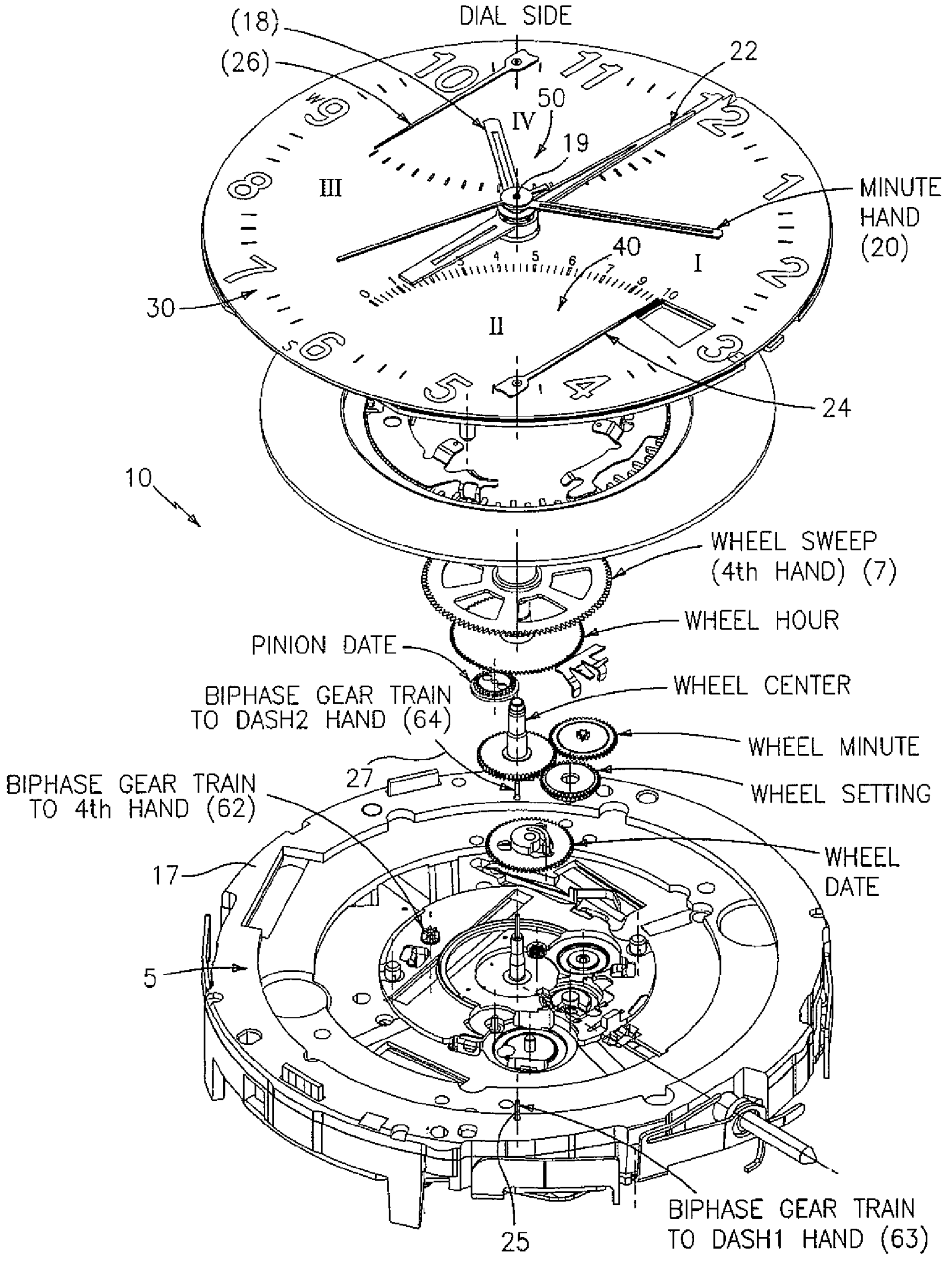
FIG. 4 is an exploded view of an electronic device with a first display assembly constructed in accordance with the present invention.

Alternatively, the electronic device may be in the form of and/or have functionality related to altitude, temperature or compass measurements, barometric pressure, heart rate display, blood pressure (and/or combinations thereof), the display of tide information such as whether the tide is high or low, sunset information, moon phases, medical information such as when medicine should be taken and how many pills at each time interval (see FIG. 4, e.g. a hand 26 may be used to display time intervals (12 o'clock, 3 o'clock, 6 o'clock, 9 o'clock, 12 o'clock) with a hand 24 being used to display the number of pills (1-10) to be taken at each interval), a countdown timer (with hand 24 being used to display the number of minutes left), or any one of additional parameters such as water pressure, water depth and oxygen left in a diver's tank (i.e. a diver's watch); object finder (i.e. to find one's car or way back to a starting location); blood/sugar levels (a glucometer); speed and distance (a runner's watch); displaying how much money is in a debit account; and any combination of the foregoing, all of which may be in addition to or in the absence of conventional timekeeping functionality.

Non-essential details of the present invention can be found in coowned and copending U.S. application Ser. No. 10/441,417, the subject matter of which is fully incorporated by reference herein.

Figure 8:
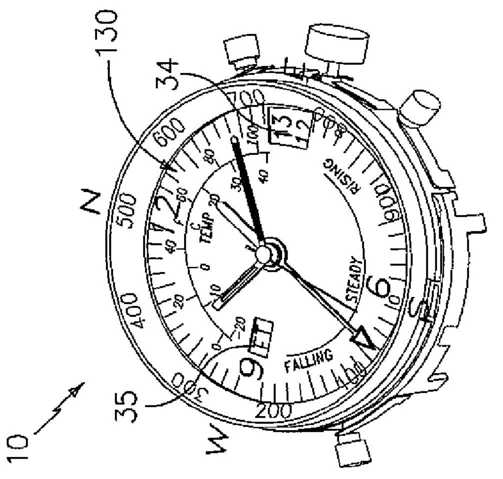
FIG. 8 is a perspective view of an electronic device constructed in accordance with the present invention with a completed second display assembly.

As set forth above, one of the objectives of the present invention is to provide a movement assembly for a wearable electronic device that can control at least one display indicator of a first display assembly (e.g. FIG. 4 as disclosed below) and at least one display indicator of a second display assembly (e.g. FIG. 8 as disclosed below).

To carry out this and other objectives, module 5 is provided with one or more subassemblies, each of which comprises at least one actuation mechanism and one or more gears rotatably engaged with the actuation mechanism, wherein actuation of the actuation mechanism causes the rotation of the one or more gears. FIGS. 1-4 illustrate several such subassemblies, each of which will now be disclosed in greater detail.

Specifically, FIG. 2 illustrates four (4) such subassemblies. In the preferred embodiment, the actuation mechanisms are stepper motors designated generally in the figures as M1, M2, M3 and M4 all of which are disposed in module 5. As would be understood in the art, their specific location is one of design choice and dictated by constraints such as spacing, power and torque requirements.

As positioned in module 5, motor M3 is provided to rotate a pinion 25', which itself may be part of an additional gear/wheel. Important is the appreciation that the rotation of the rotor of motor M3 imparts rotation to pinion 25' via a gear train, generally indicated at 63. Likewise, motor M4 is provided to rotate pinion 27', which itself may be part of an additional gear/wheel, and the rotation of the rotor of motor M4 imparts rotation of pinion 27' via a gear train, generally indicated at 64 in a similar manner. The purpose of motors M1 and M2 will be further disclosed below.

With module 5 constructed as set forth in FIGS. 1-3, namely with pinions 25' and 27' extending from housing 17, varying display assemblies can provided thereon.

For example, reference is now made to FIG. 4, which illustrates an exploded view of an electronic device constructed in accordance with the first embodiment. Among other things, the electronic device of FIG. 4 illustrates a first display assembly generally indicated at 30 comprising at least a first display indicator (e.g. a display hand 24 or a display hand 26). Generally speaking, this first embodiment comprises module 5 in which are disposed many components, the material ones of which pertain to the present invention being hereinafter disclosed. It should be understood that the present disclosure will omit, for purposes of brevity, certain basic and very well known concepts regarding such electronic devices, such as for example, the basic construction and arrangements of gears and/or gear trains to rotate a plurality of "standard" hands, such as an hour hand 18 and a minute hand 20 (as part of an analog watch), as being well within the purview of one skilled in the art. For completeness, it should now be appreciated that motor M1 is provided to rotate hour hand 18 and minute hand 20 in a known manner (e.g. being coupled to a gear train 61 for conveying the rotational activity generated by the rotor of motor M1). A fourth hand, the particulars and advantages thereof being set forth in greater detail in the aforementioned '417 application, may be controlled by stepper motor M2 and another gear train, generally indicated at 62. Again, the construction of these respective gear trains are also well within the purview of one ordinarily skilled in the art.

In the preferred embodiment, at least motors M3 and M4 are bi-directional stepper motors thus being able to rotate in either direction, and the construction of acceptable stepper motors to functionally operate in this manner are widely available and well within the understanding of those skilled in the art. Motor M1 need not be bi-directional as would be known to one skilled in the art. It is preferable that motor M2 is bi-directional as well.

Display assembly 30 of this first embodiment comprises a dial 32 made of Mylar or another suitable plastic. Dial 32 may have thereon numerals, such as 1-12 corresponding to "hour" designations, printed, silk-screened or otherwise formed thereon. Other indicia to assist in telling time may also be provided on dial 32. Display assembly 30 also comprises the aforementioned one or more display hand (e.g. hand 24 and/or hand 26) aside from the (optional) conventional hour and minute hand.

As should be appreciated by one skilled in the art, the location/position of these display hands are merely dictated, for example, by the position of pins 25, 27 respectively (e.g. without the pinions 25', 27' as illustrated in FIG. 1) and the position of the respective subassemblies. Thus, the particular location (e.g. at the 4 and 10 o'clock positions) of hands 24, 26 are shown by example and not limitation.

The use of display hands 24 and 26 provide advantages not heretofore known in the prior art, and reference to application Ser. No. 10/441,417 may be had for disclosure of just some of the advantages and uses afforded thereby. As but just one example, the use of display hands 24 and 26 can provide for the display of parameters and information set forth above. Controlling of the rotation of such display hands will be disclosed below.

In the interim, reference is made to FIGS. 5-8, which illustrate the second exemplary display assembly, generally indicated at 130 in various stages of completion, having at least one display indicator. Specifically, second display assembly 130 comprises a dial 33 having one or more windows 34 and 35. The display indicators of this second display assembly 130 preferably comprise wheels or discs, the particulars of which will now be disclosed. This second display assembly 130 is constructed to be operatively coupled to module 5.

Figure 5:
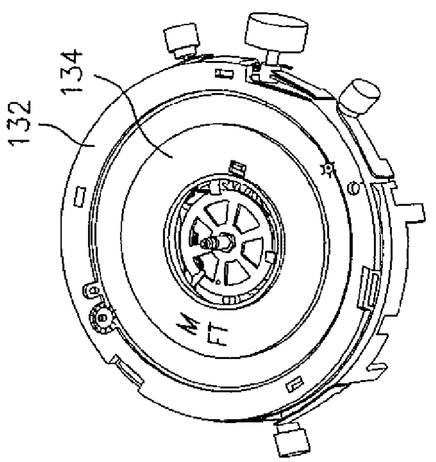
FIGS. 5-7 are perspective views of the module assembly of FIG. 1 in subsequent stages of completion for an electronic device constructed in accordance with the present invention.
Figure 7:
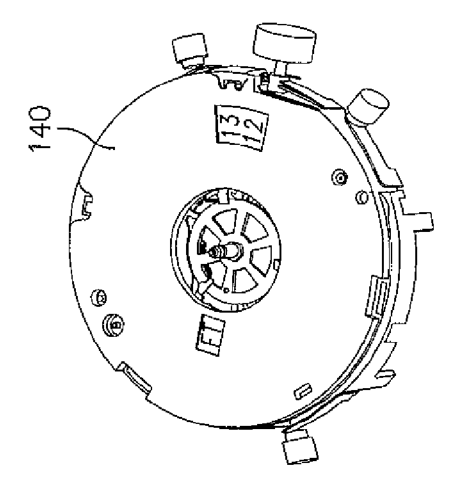
Figure 6:
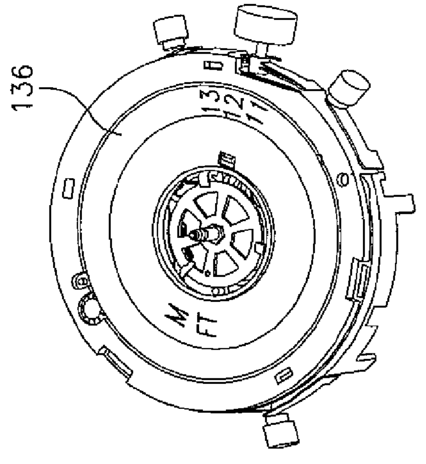

For example, FIG. 5 (and FIG. 3) illustrate module 5 with a module plate 132 positioned thereon. FIG. 5 also illustrates a first display indicator of display assembly 130 in the form of a first disc 134 displaying the "feet" and "meter" designations thereon. FIG. 6 illustrates second display assembly 130 with a second display indicator in the form of a second disc 136 that overlies first disc 134. In this exemplary second embodiment, disc 136 displays increments of altitude, with "11," "12" and "13" being illustrated as exemplary designations. Clearly, in a commercial embodiment, additional designations (e.g. "1," "2," "3," . . . "14," "15," "16," etc.) will be indicated. FIG. 7 illustrates module 5 and second display assembly 130 with a holding plate 140 thereon, while FIG. 8 illustrates an assembled display assembly 130 for the electronic device (e.g. an altimeter watch) of the second embodiment. Obviously, the aforementioned indications can be in units of 100s, 1000s or the like.

Returning to the first embodiment of FIG. 4 and the second embodiment of FIGS. 5-6, it can be seen that in the first embodiment, the position of pins 25 and 27 provide for the mounting thereon of display hands 24 and 26, respectively. Thus in this first embodiment, pins 25 and 27 can be used to rotate hands 24 and/or 26.

On the other hand, FIG. 5 illustrates how first disc 134 can be dimensioned and positioned to be driven by pinion 27' (which is positioned on pin 27) while FIG. 6 illustrates second disc 136 being dimensioned and positioned to overly disc 134 so that it can be driven by pinion 25' (which is positioned on pin 25). More specifically, the small pinions/gears on the respective pins 25, 27 preferably have teeth that mesh with corresponding teeth on the outer circumference of discs 134 and 136, respectively. FIG. 5 illustrates how the pinion on pin 27' is larger than the pinion on pin 25' so as to permit discs 134 and 136 to overly each other and be properly driven by the appropriate pinion, since if the pinions were sized identically, the discs would have great difficulty in being independently driven/rotated as illustrated.

The gearing ratio to provide for the desirable display rotation or movement of the display hands or discs/rings would be one of design choice depending on the desired or required incremental rotation of the display indicator, an example of which is provided in the '417 application. Thus the number of wheels in any particular gearing assembly may be more or less than that disclosed herein, and are really one of design choice for the intended function and based upon a number of criterions known to the ordinary designer.

It can thus be seen that one module assembly, namely module 5 can be provided to accommodate at least one display indicator (e.g. hand 24 and/or 26) of first display assembly 30 and at least one display indicator (e.g. disc 134 and/or 136) of second display assembly 130 in a wearable electronic device. Importantly, the controlling of the respective indicators requires differing controlling functionality.

A controller provides the proper and accurate controlling, positioning and rotation of hands 24 and 26 on the one hand, and discs 134 and 136 on the other. Details of a generic controller for controlling either of the aforementioned two display assemblies can be found in the aforementioned '417 application with reference to controller 100 therein, and the controller of the present invention preferably comprises all of the functional features described therein to carry out the objectives and features of the present invention. The added functionality particular to the present invention shall now be disclosed.

Figure 9:
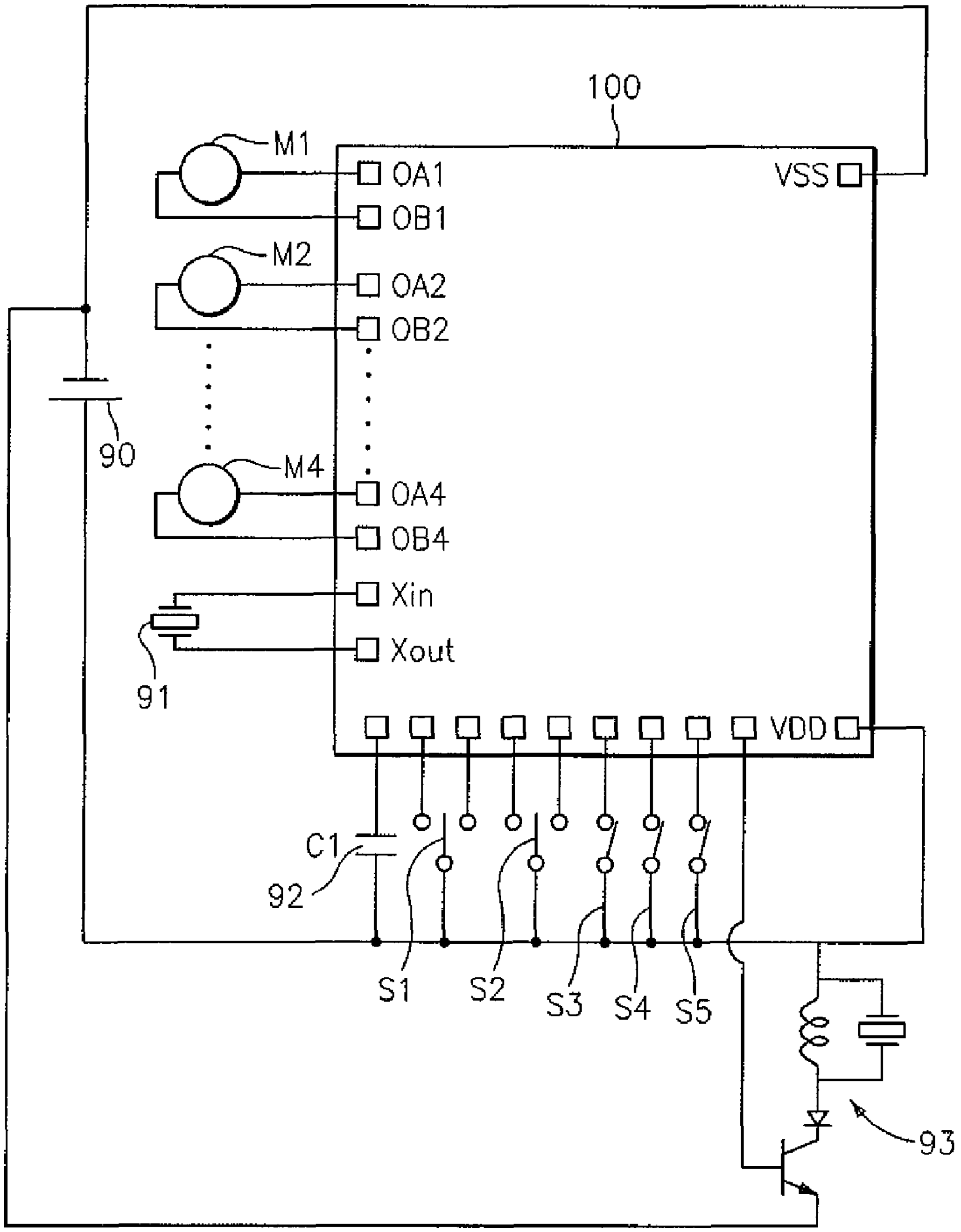
FIG. 9 is a circuit diagram for an electronic device constructed in accordance with the present invention.

General reference may be made to FIG. 9 for a partial block diagram of the electronic device of the present invention (e.g. electronic device 10), which illustrates among other things, interface connections to motors M1, M2, M3 and M4 and switches S1-S5. Switches S1-S5 are intended to generically indicate both side/top mounted pushers, as well as side mounted rotatable crowns, and thus respond to the actuation (i.e. pulling and/or pushing) action thereof. In the case of crowns, the pulling and or pushing actuations may be provided for setting hands 18, 20 and/or calibrating, such as hands 24, 26 on the one hand and discs 134 and 136 on the other. A preferred hand and disc calibration methodology and arrangement is disclosed in the aforementioned '417 application and in copending and coowned application Ser. No. 10/737,406 the subject matter which is likewise incorporated by reference as if fully set forth herein. In this way, it is always possible to calibrate (i.e. initialize the position of) hands 24, 26 and/or discs 134, 136 so that controller 100 knows their respective positions. An input/output control circuit 110 controls the crown actuations and pushbutton switches and provides such signaling information to CPU 101.

Figure 10:
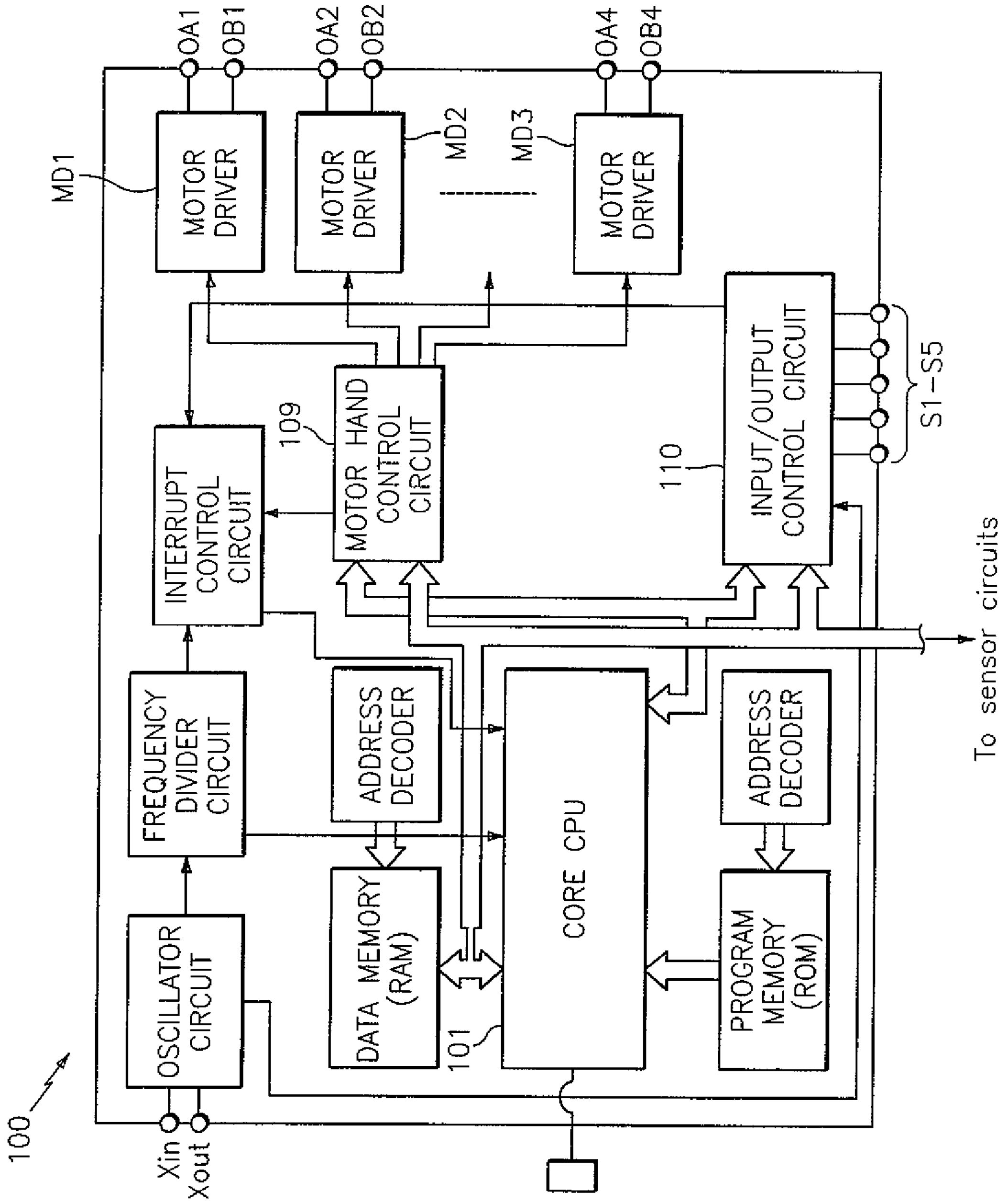
FIG. 10 is a block diagram of a controller for use in an electronic device constructed in accordance with the present invention.

Reference may also be made to FIG. 10, which illustrates a block diagram of controller 100. Particular reference is made to motor control circuit 109, which receives a commanded "next number of pulses" from CPU core 101 and generates the pulsed and phased signals necessary to move a desired motor (M1, M2, M3, M4) a desired amount and in a desired direction. Pulse outputs of motor control circuit 109 are buffered by motor drivers MD1, MD2, MD3, and MD4 and applied to respective motors M1, M2, M3, M4.

By appropriate configuration and programming of controller 100, it is thus possible to ensure that the functionality and operation of controller 100 adjusts for the particular display indicator of the particular display assembly. Thus, controller 100 can be customized or changed to adjust to properly control the particular display indicators. Thus, controller 100 can coordinate and control the display of any parameter of other information with hands, discs or other assemblies.

Reference should be made to the '417 application for a more detailed description of the circuit composition and/or hand control features and elements to interface electronic device 10 to "the outside world", and FIG. 10 showing a generic interface is illustrated for receiving signals from a parallel and/or serial sensor interface. By way of example and not limitation, some of the sensor circuits for measuring external parameters applicable in the present invention are ambient temperature, altitude and water depth, body temperature, heart rate, blood pressure and compass headings, just to name a few.

Although the preferred embodiment provides that controller 100 is highly integrated wherein all timing and display functionality is controlled in controller 100, alternate embodiments could separate the timekeeping functions from those processing and displaying stored or sensed data, as would be understood by one skilled in the art.

Whether using sensors (internal or external (e.g. a transmitter, such as a heartrate transmitter by way of example)) or stored data (such as that which is downloadable), known methodologies provide for the smooth rotation of display hands 24, 26 and discs 134, 136. For example, to determine the number of pulses and direction to move a rotor of a stepper motor to its next position it is necessary to know where the rotor is in terms of a number of pulses, subtract that from the new sensor (or stored) value converted to pulses, and based on the magnitude and sign of the difference, pulse the stepper motor the number of pulses needed to move the rotor the desired amount and in the desired direction. In an alternate embodiment the calculations above can be performed using converted sensor (or stored) values in digital format and then, by applying the appropriate scale factors, develop the number of pulse determined above. Well known programming techniques along with the above methodology, allow controller 100 to determine whether and when to signal motor control circuit 109 to step the respective stepper motor so that a hand or disc should rotate.

Again, proper microcontroller codes and/or other programming functionality allow for the customization and changing of the controller to be properly configured to accurately control the display indicators, regardless of their type or position on module 5.

The '417 application provides an excellent description of particular examples of displaying information using a display indicator using stored, sensed or transmitted data.

It can thus be seen that the present invention provides a unique movement assembly for controlling at least one display indicator of a first display assembly and at least one display indicator of a second display assembly in a wearable electronic device, wherein the at least one display indicator of the first display assembly is arranged different (e.g. is a display hand) from the arrangement of the at least one display indicator of the second display assembly (e.g. is a ring or a disc), wherein the movement assembly is adapted for individually receiving both the first display assembly and the second display assembly. In other words, one generic module construction can be used to accommodate/receive a plurality of differing display assemblies.

As set forth above, the movement assembly comprises a module within which is disposed a subassembly comprising at least one actuation mechanism and one or more gears rotatably engaged with the actuation mechanism and a controller operatively coupled to the actuation mechanism for controlling the actuation of the actuation mechanism. In accordance with the present invention, means for changing the functionality of the controller is provided for controlling the specific display indicators of the display assembly on the module. The means for changing the functionality of the controller is based which (or what type of) display assembly will be used therewith.

In one embodiment, the means for changing the functionality of the controller comprises software-programming functionality. Such software-programming functionality may be provided in separate controllers. For example, it should now be clear that module 5 can be used to control the display assemblies of both (although not at the same time) FIG. 4 (display assembly 30) and FIG. 8 (display assembly 130). Thus, the only material difference to the movement assembly of FIG. 1is in the substitution of controllers (aside from minor modifications such as the addition of pinions 25' and 27'). Therefore, significant reductions in manufacturing costs and time can be achieved by merely needing to substitute a new controller with functionality to drive the particular display assembly being used.

The means for changing the functionality of the controller may also and/or alternatively comprise an arrangement on the display assembly itself. For example, pins or another assembly may be provided such that when the particular display assembly is configured on module 5, there is a "plug-in" like effect, thereby providing signals to the controller indicating which display assembly has been provided thereon. Such signaling techniques are known in the art and using them eliminates yet the aforementioned step of substitution of the controller itself.

Still further, the means for changing may comprise a button sequence, which can be initiated at the manufacturing stage or by the end user. For example, the functionality of the controller may be changeable or customizable or otherwise modifiable (all such variations and like terms intending to imply throughout this disclosure the same idea of changing the functionality of the controller to control the particular display indicators of the specific display assembly on module 5) by the user or after the electronic device has been constructed. Such an innovation would allow, for example, an end user to change the display assemblies if practical or desirable.

The functionality (of the microcontroller) could also be changed or selected by bond options, e.g. by adding or omitting bond wires, or by closing or opening electrical connections on the printed circuit board such as by adding or omitting of solder joints.

All of the foregoing thus provides that the display functionality of the wearable electronic device is changeable based on the display assembly to be operatively coupled to the one or more gears in the module and whereby the module and subassembly can be used to provide differing display functionality based on the display assembly coupled thereto.

In specific embodiments, the at least one display indicator of the first display assembly is a display hand (e.g. FIG. 4) and the at least one display indicator of the second display assembly is a disc (e.g. FIGS. 5, 6). Alternatively, the display indicator of the second display assembly may be a ring (e.g. a date ring as but one example).

Figure 12:
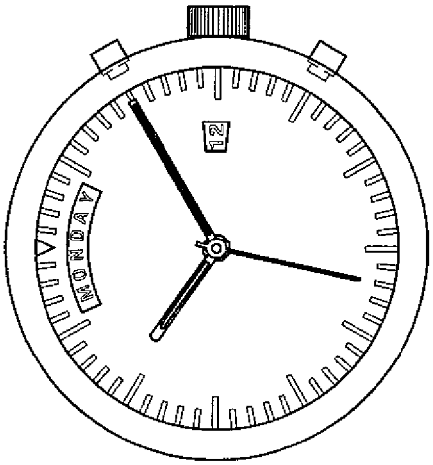
FIG. 12 illustrates yet an additional display assembly with yet other display indicators (in the form of discs or rings) for indicating the days of the week and the date, such indicators being similar in configuration to discs 134 and 136.
Figure 13:
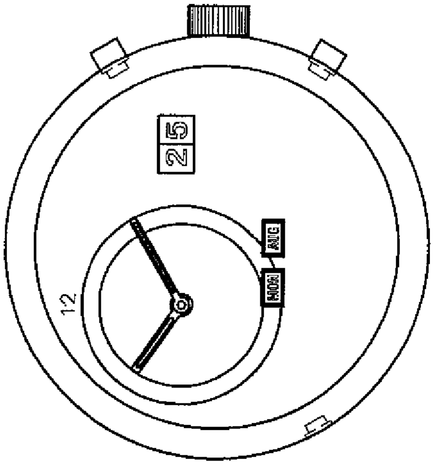

Also, to be sure, the display indicator of the first embodiment may be a ring or disc with the display indicator of the second embodiment also being a ring or disc. In this arrangement, the novelty of the invention still remains in that the indicators are for indicating different parameters or differing information. That is, it is the controller that still needs to change to take into account that the information being displayed will change, and the scales, parameters, algorithms for displaying such information all have to change depending on the physical type of display indicator (e.g. a ring, disc or hand) and just as important, what the display indicator will be indicating (e.g. a display indicator of a first embodiment may be a disc displaying altitude (e.g. FIG. 8) while a display indicator of a second embodiment may be a mere date ring/disc (e.g. FIG. 12 or 13)). Thus, the functionality of controller 100 must be changed/modified and/or customized to take into account such different display arrangements.

Thus the present invention also discloses a wearable electronic device comprising the movement assembly set forth above. And it should thus be clear that the improvement comprises a controller with changeable functionality, operatively coupled to the actuation mechanism, for controlling the actuation of the actuation mechanism, wherein the functionality of the controller for operating the first display assembly is different from the functionality for operating the second display assembly, whereby the display functionality of the wearable electronic device is changeable based on the display assembly operatively coupled to the one or more gears in the module and whereby the module and subassembly can be used to provide differing display functionality based on the display assembly coupled thereto. In a similar way, the improvement may comprise customizing the controller to individually and operatively control the at least one display indicator of the first display assembly and operatively control the at least one display indicator of the second display assembly. Again, the physical construction of the display indicators may be different (e.g. a display hand vs. a disc or ring) or the parameter/information to be displayed may be different between the similar rings of differing display assemblies (e.g. heartrate vs. altitude, just to name but one example).

Lastly, to be sure, a method of constructing a wearable electronic device comprising a movement assembly for controlling at least one display indicator of a first display assembly and at least one display indicator of a second display assembly is also provided. As set forth in greater detail above, the method comprises the steps of providing the wearable electronic device with a controller with functionality specific to the at least one indicator of the first display assembly and with functionality specific to the at least one indicator of the second display assembly, wherein the controller is operatively coupled to the actuation mechanism for controlling the actuation of the actuation mechanism; wherein the functionality of the controller for operating the at least one display indicator of the first display assembly is different from the functionality for operating the at least one display indicator of the second display assembly; whereby the display functionality of the wearable electronic device is changeable based on the display assembly operatively coupled to the one or more gears in the module and whereby the module and subassembly can be used to provide differing display functionality based on the display assembly coupled thereto. The changeability may take place through an external arrangement (external programming) or internal (e.g. "a button sequence), alternative bonding options (i.e. adding or omitting bond wires) and/or by closing or opening electrical connections on the printed circuit board by adding or omitting of solder joints."

It will thus be seen that the present invention is both patentably different from and a significant improvement over known devices. Specifically, the present invention provides a unique way to provide a single module assembly that can accommodate differing display assemblies. The innovation of a generically constructed platform requiring merely a customized (or otherwise changeable or modifiable) controller to provide the versatility and flexibility herein is believed to be both novel and non-obvious in view of the known art.

Figure 14:
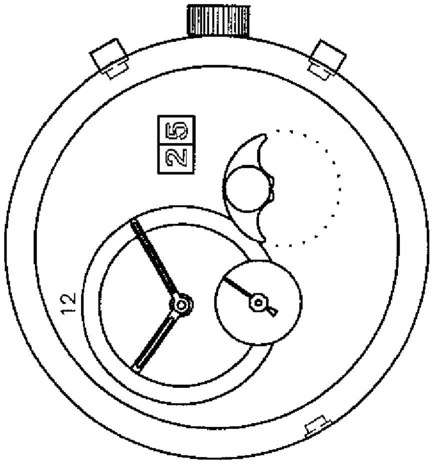
FIGS. 13-14 illustrate yet additional display assemblies (e.g. date, day, month, moon phases, etc.) constructed in accordance with the present invention.
Figure 11:
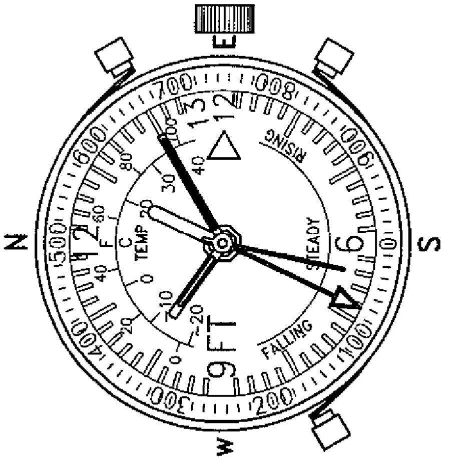
FIG. 11 illustrates an electronic device constructed in accordance with the present invention with yet an additional display assembly comprising a display indicator for indicating temperature and a secondary scale for altitude.

While the invention has been particularly shown and described with respect to preferred embodiments thereof, it will be understood by those skilled in the art that changes in form and details may be made therein without departing from the scope and spirit of the invention. For example, in place of a ring or disc, an elongated member may be used (e.g. a moon phase as in FIG. 14).

Similarly, the pins and/or pinions (e.g. 25, 25', 27, 27') may be made larger or smaller depending on the constraints and requirements (e.g. spacing, torque, power) of the electronic device. Likewise, the position of such pins and pinions may vary to accommodate differing disc and/or hand positions such as the unique display assembly of FIG. 14. Still further, additional intermediate wheels may be used, e.g. between a display indicator such as a ring or disc on the one hand, and pinion 25' or 27' on the other, so that the ring/discs (or even display hands) could be flexibly positioned about the face of the display without the need to move the actual stepping motors or gear assemblies. Thus, for example, pinion 25' could, if desired, drive a small ring at the 9 o'clock position if an intermediate wheel is used to operatively mesh the two.

What is claimed is:

1. A movement assembly for controlling at least one display indicator of a first mechanical display assembly that displays informational indicia related to at least a first mode and at least one display indicator of a second mechanical display assembly that displays informational indicia related to at least a second mode in a wearable electronic device, wherein the at least one display indicator of the first mechanical display assembly conveys information indicative of the at least first mode and the at least one display indicator of the second mechanical display assembly conveys information indicative of the at least second mode, wherein the at least first mode is different from the at least second mode, and wherein the movement assembly is adapted for individually receiving both the first mechanical display assembly and the second mechanical display assembly, wherein the movement assembly comprises:

a module within which is disposed a subassembly comprising at least one actuation mechanism and one or more gears rotatably engaged with the actuation mechanism, wherein actuation of the actuation mechanism causes the rotation of the one or more gears;

a controller whose functionality automatically changes based on the mechanical display assembly coupled thereto, operatively coupled to the actuation mechanism, for controlling the actuation of the actuation mechanism; and means for changing the functionality of the controller based on the one of the first and second mechanical display assemblies for operative coupling to the one or more gears in the module;

wherein the first display assembly and the second display assembly are not simultaneously coupled to the movement assembly;

wherein the display functionality of the wearable electronic device is changeable based on the mechanical display assembly operatively coupled to the one or more gears in the module and wherein the module and subassembly can be used to provide differing display functionality based on the mechanical display assembly coupled thereto.

2. The movement assembly as claimed in claim 1, wherein the means for changing the functionality of the controller comprises software-programming functionality.

3. The movement assembly as claimed in claim 1, wherein the means for changing the functionality of the controller comprises an arrangement on the mechanical display assembly itself to provide a "plug-in" like effect, thereby providing signals to the controller indicating which mechanical display assembly has been provided thereon.

4. The movement assembly as claimed in claim 1, wherein the means for changing the functionality of the controller comprises a button sequence.

5. The movement assembly as claimed in claim 1, wherein the means for changing the functionality of the controller is achieved by bonding options, namely by providing and/or omitting bond wires, closing or opening selected electrical connections and/or adding or omitting of selected solder joints.

6. The movement assembly as claimed in claim 1, wherein the at least one display indicator of the first mechanical display assembly is a display hand and the at least one display indicator of the second mechanical display assembly is a disc having surface indicia to convey information, wherein said actuation mechanism individually rotates said display hand and said disc.

7. The movement assembly as claimed in claim 1, wherein the at least one display indicator of the first mechanical display assembly is a display hand and the at least one display indicator of the second mechanical display assembly is a ring having surface indicia to convey information, wherein said actuation mechanism individually rotates said display hand and said ring.

8. A wearable electronic device comprising a movement assembly for controlling at least one display indicator of a first mechanical display assembly that displays informational indicia related to at least a first mode and at least one display indicator of a second mechanical display assembly that displays informational indicia related to at least a second mode, wherein the at least one display indicator of the first mechanical display assembly conveys information indicative of the at least first mode and the at least one display indicator of the second mechanical display assembly conveys information indicative of the at least second mode, wherein the at least first mode is different from the at least second mode, and wherein the movement assembly is adapted for individually receiving both the first mechanical display assembly and the second mechanical display assembly and comprises a module within which is disposed a subassembly comprising at least one actuation mechanism and one or more gears rotatably engaged with the actuation mechanism, wherein actuation of the actuation mechanism causes the rotation of the one or more gears, wherein the wearable electronic device further comprises:

a controller whose functionality automatically changes based on the mechanical display assembly coupled thereto, operatively coupled to the actuation mechanism, for controlling the actuation of the actuation mechanism;

wherein the functionality of the controller for operating the first mechanical display assembly to display informational indicia related to the at least first mode is different from the functionality for operating the second mechanical display assembly to display informational indicia related to the at least second mode; and wherein the first display assembly and the second display assembly are not simultaneously coupled to the movement assembly;

wherein the display functionality of the wearable electronic device is changeable based on the mechanical display assembly operatively coupled to the one or more gears in the module and wherein the module and subassembly can be used to provide differing display functionality based on the mechanical display assembly coupled thereto.

9. The wearable electronic device as claimed in claim 8, wherein the configuration of the subassembly and the module is independent of whether the first mechanical display assembly or the second mechanical display assembly is operatively coupled to the one or more gears.

10. The wearable electronic device as claimed in claim 9, wherein the at least one display indicator of the first mechanical display assembly is a display hand and the at least one display indicator of the second mechanical display assembly is a ring having surface indicia to convey information, wherein said actuation mechanism individually rotates said display hand and said ring.

11. The wearable electronic device as claimed in claim 8, wherein the at least one display indicator of the first mechanical display assembly is a display hand and the at least one display indicator of the second mechanical display assembly is a disc having surface indicia to convey information, wherein said actuation mechanism individually rotates said display hand and said disc.

12. A wearable electronic device comprising a movement assembly for controlling at least one display indicator of a first mechanical display assembly that displays informational indicia related to at least a first mode and at least one display indicator of a second mechanical display assembly that displays informational indicia related to at least a second mode, wherein the at least one display indicator of the first mechanical display assembly conveys information indicative of the at least first mode and the at least one display indicator of the second mechanical display assembly conveys information indicative of the at least second mode, wherein the at least first mode is different from the at least second mode, and wherein the movement assembly is adapted for individually receiving both the first mechanical display assembly and the second mechanical display assembly and comprises a module within which is disposed a subassembly comprising at least one actuation mechanism and one or more gears rotatably engaged with the actuation mechanism, wherein actuation of the actuation mechanism causes the rotation of the one or more gears, wherein the wearable electronic device further comprises:

- a customized controller, operatively coupled to the actuation mechanism, for controlling the actuation of the actuation mechanism;
- wherein the functionality of the controller is customized to individually and operatively control the at least one display indicator of the first mechanical display assembly and operatively control the at least one display indicator of the second mechanical display assembly, wherein the functionality of the controller automatically changes based on the mechanical display assembly coupled thereto;
- wherein the functionality of the controller to operatively control the at least one display indicator of the first mechanical display assembly is different from the functionality for operating the at least one display indicator of the second mechanical display assembly; and
- wherein the first display assembly and the second display assembly are not simultaneously coupled to the movement assembly;
- wherein the display functionality of the wearable electronic device is changeable based on the mechanical display assembly operatively coupled to the one or more gears in the module and wherein the module and subassembly can be used to provide differing display functionality based on the mechanical display assembly coupled thereto.

13. A method of constructing a wearable electronic device comprising a movement assembly for controlling at least one display indicator of a first mechanical display assembly that displays informational indicia related to at least a first mode and at least one display indicator of a second mechanical display assembly that displays informational indicia related to at least a second mode, wherein the at least one display indicator of the first mechanical display assembly conveys information indicative of the at least first mode and the at least one display indicator of the second mechanical display assembly conveys information indicative of the at least second mode, wherein the at least first mode is different from the at least second mode, and wherein the movement assembly is adapted for individually receiving both the first mechanical display assembly and the second mechanical display assembly and comprises a module within which is disposed a subassembly comprising at least one actuation mechanism and one or more gears rotatably engaged with the actuation mechanism, wherein actuation of the actuation mechanism causes the rotation of the one or more gears, wherein the method comprises the steps of:

- providing the wearable electronic device with a controller with functionality specific to the at least one indicator of the first mechanical display assembly and with functionality specific to the at least one indicator of the second mechanical display assembly, wherein the controller is operatively coupled to the actuation mechanism for controlling the actuation of the actuation mechanism and wherein the functionality of the controller automatically changes based on the mechanical display assembly coupled thereto; and
- wherein the functionality of the controller for operating the at least one display indicator of the first mechanical display assembly is different from the functionality for operating the at least one display indicator of the second mechanical display; and
- wherein the first display assembly and the second display assembly are not simultaneously coupled to the movement assembly;
- wherein the display functionality of the wearable electronic device is changeable based on the mechanical display assembly operatively coupled to the one or more gears in the module and wherein the module and subassembly can be used to provide differing display functionality based on the mechanical display assembly coupled thereto.

14. The method as claimed in claim 13, wherein the at least one display indicator of the first mechanical display assembly is a display hand and the at least one display indicator of the second mechanical display assembly is a disc having surface indicia to convey information, wherein said actuation mechanism individually rotates said display hand and said disc.

15. The method as claimed in claim 13, wherein the at least one display indicator of the first mechanical display assembly is a display hand and the at least one display indicator of the second mechanical display assembly is a ring having surface indicia to convey information. wherein said actuation mechanism individually rotates said display hand and said ring.

16. The method as claimed in claim 13, wherein the means for changing the functionality of the controller comprises software-programming functionality.

17. A method of constructing a wearable electronic device comprising a movement assembly for controlling at least one display indicator of a first mechanical display assembly that displays informational indicia related to at least a first mode and at least one display indicator of a second mechanical display assembly that displays informational indicia related to at least a second mode, wherein the at least one display indicator of the first mechanical display assembly conveys information indicative of the at least first mode and the at least one display indicator of the second mechanical display assembly conveys information indicative of the at least second mode, wherein the at least first mode is different from the at least second mode, and wherein the movement assembly is adapted for individually receiving both the first mechanical display assembly and the second mechanical display assembly and comprises a module within which is disposed a subassembly comprising at least one actuation mechanism and one or more gears rotatably engaged with the actuation mechanism, wherein actuation of the actuation mechanism causes the rotation of the one or more gears, wherein the method comprises the steps of:

providing the wearable electronic device with a controller with functionality that is automatically changeable based on the mechanical display assembly coupled thereto, said controller operatively controlling the at least one indicator of the first mechanical display assembly and operatively controlling the at least one indicator of the second mechanical display assembly, wherein the controller is operatively coupled to the actuation mechanism for controlling the actuation of the actuation mechanism; and wherein the functionality of the controller for operating the at least one display indicator of the first mechanical display assembly is different from the functionality for operating the at least one display indicator of the second mechanical display assembly; and wherein the first display assembly and the second display assembly are not simultaneously coupled to the movement assembly;

wherein the display functionality of the wearable electronic device is changeable based on the mechanical display assembly operatively coupled to the one or more gears in the module and wherein the module and subassembly can be used to provide differing display functionality based on the mechanical display assembly coupled thereto.

18. The method as claimed in claim 17, including the step of changing the functionality of the controller by software-programming being downloaded from an external computer source.

19. The method as claimed in claim 17, including the step of changing the functionality of the controller by providing signals to the controller indicative of which mechanical display assembly has been provided on the movement assembly.

20. The method as claimed in claim 17, including the step of changing the functionality of the controller by a button sequence.

21. The method as claimed in claim 17, including the step of changing the functionality of the controller by at least one of (i) providing and/or omitting bond wires, (ii) closing or opening selected electrical connections on a printed circuit board and/or (iii) adding and/or omitting of selected solder joints on the printed circuit board.

22. A wearable electronic device comprising a movement assembly for controlling at least one display indicator of a first mechanical display assembly and at least one display indicator of a second mechanical display assembly, wherein the location of the at least one display indicator of the first mechanical display assembly relative to the movement assembly is visibly different from the location of the at least one display indicator of the second mechanical display assembly relative to the movement assembly, wherein the movement assembly is adapted for individually receiving both the first mechanical display assembly and the second mechanical display assembly and comprises a module within which is disposed a subassembly comprising at least one actuation mechanism and one or more gears rotatably engaged with the actuation mechanism, wherein actuation of the actuation mechanism causes the rotation of the one or more gears;

a controller with functionality to accommodate the mechanical display assembly coupled thereto, said controller operatively coupled to the actuation mechanism, for controlling the actuation of the actuation mechanism;

wherein the functionality of the controller for operating the first mechanical display assembly is different from the functionality for operating the second mechanical display assembly; and wherein the first display assembly and the second display assembly are not simultaneously coupled to the movement assembly;

wherein the display functionality of the wearable electronic device is changeable based on the mechanical display assembly operatively coupled to the one or more gears in the module and wherein the module and subassembly can be used to provide differing display functionality based on the mechanical display assembly coupled thereto.

* * * * *